United States Patent [19]

Yeakley et al.

[11] Patent Number: 4,497,465
[45] Date of Patent: Feb. 5, 1985

[54] PIVOTAL MECHANISM UPON WHICH TRACKING MIRRORS AND THE LIKE USED IN OPTICAL SYSTEMS MAY BE MOUNTED

[75] Inventors: Lester M. Yeakley, Boulder; Karen M. Fitzgerald, Lafayette, both of Colo.

[73] Assignee: Storage Technology Partners II, Louisville, Colo.

[21] Appl. No.: 481,045

[22] Filed: Mar. 31, 1983

[51] Int. Cl.³ ............................................. A47F 7/14
[52] U.S. Cl. ................................. 248/466; 248/274; 267/160
[58] Field of Search ............. 248/274, 466, 479, 480, 248/476, 467; 308/2 A; 267/160; 29/173, 436; 350/6.6

[56] References Cited

U.S. PATENT DOCUMENTS

| 2,793,028 | 5/1957 | Wheeler | 29/173 |
| 3,102,721 | 9/1963 | Linville | 267/160 |
| 3,124,873 | 3/1964 | Troeger | 29/173 |
| 3,142,888 | 8/1964 | Troeger | 29/173 |
| 3,181,851 | 5/1965 | Troeger | 29/173 |
| 3,807,029 | 4/1974 | Troeger | 29/436 |
| 3,825,992 | 7/1974 | Troeger | 29/436 |
| 3,957,316 | 5/1976 | Armitage | 308/2 A |
| 4,261,211 | 4/1981 | Haberland | 267/160 |
| 4,369,348 | 1/1983 | Stetson et al. | 350/6.6 |

*Primary Examiner*—William H. Schultz
*Assistant Examiner*—Ramon O. Ramirez
*Attorney, Agent, or Firm*—Bryant R. Gold

[57] ABSTRACT

Disclosed is a low cost flexural mechanism upon which tracking mirrors and the like used in optical systems may be mounted. The flexural mechanism is made from a single sheet of metal by placing a desired shape or pattern in the metal. The resulting shape is then formed into a base, mounting surface, and flex arms. The mechanism is stiff in directions other than rotation, has low noise, has low thermal sensitivity, and can be made in any practical size. The flexural mechanism can be designed to place the pivot axis at the center of gravity of the mass being rotated, even when the center of gravity is outside the flexural mechanism.

6 Claims, 16 Drawing Figures

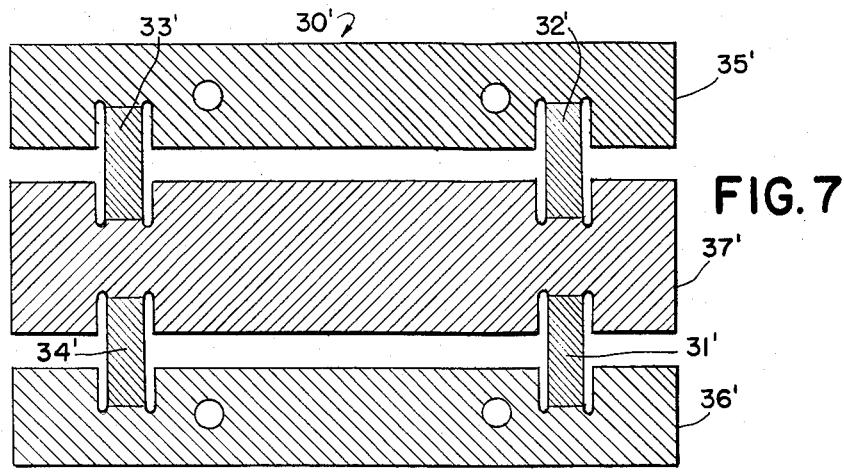
FIG. 7
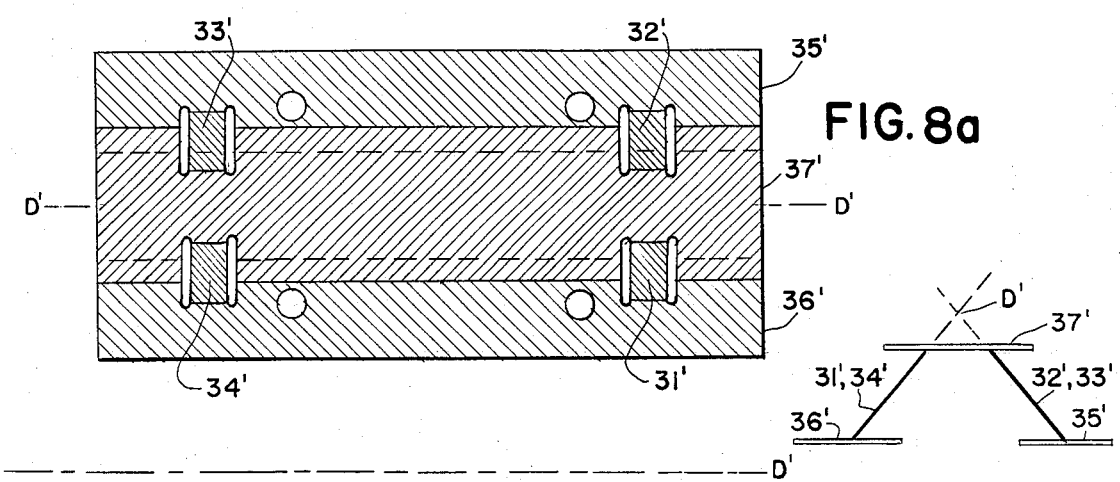
FIG. 8a
FIG. 8c
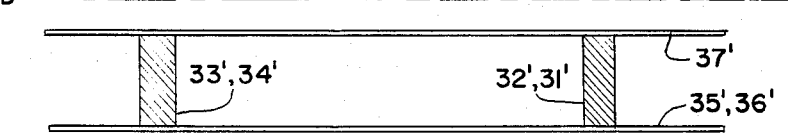
FIG. 8b
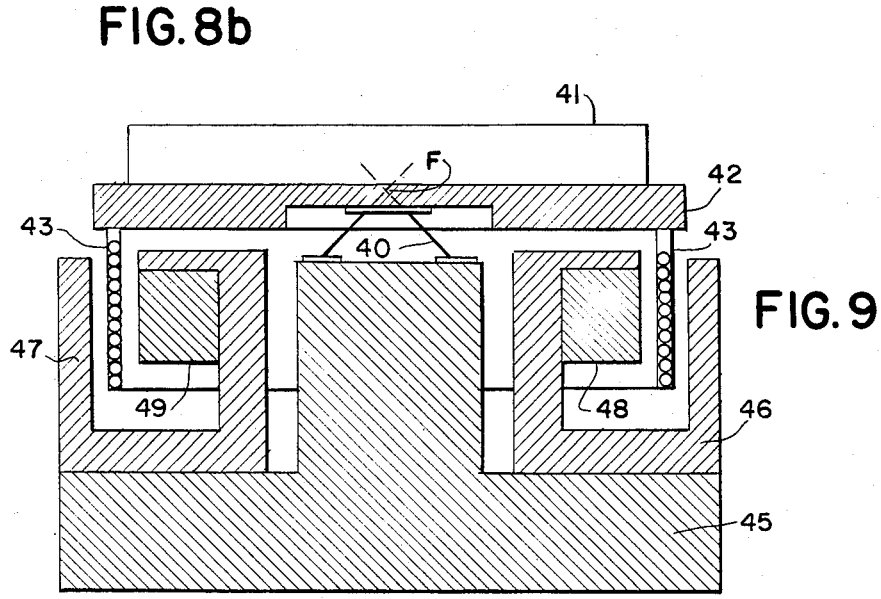
FIG. 9

PIVOTAL MECHANISM UPON WHICH TRACKING MIRRORS AND THE LIKE USED IN OPTICAL SYSTEMS MAY BE MOUNTED

BACKGROUND OF THE INVENTION

This invention relates to a pivotal mechanism for use in optical systems. More particularly, the invention relates to an improved pivotal or flexural mechanism that is inexpensive, stiff in directions other than the direction of rotation, and insensitive to temperature variations. Even more particularly, the invention relates to a flexural mechanism that can be designed to selectively place the pivot axis at a desired location, such as at the center of gravity of the mass being rotated, even when that desired location is outside of the mechanism.

Mirrors are used in optical systems to direct a beam of light to a desired location. In most optical systems it is necessary to be able to rotate the mirror in order to change the location of the directed beam. The amount of rotation is usually small, typically only a few degrees in either direction, but this rotation must be precisely controlled.

A variety of pivotal mechanisms upon which mirrors and the like may be mounted are known in the art for providing the needed rotational capability. However, all such mechanisms known to applicants have one or more disadvantages associated with the use thereof. These disadvantages include limited life, high cost, high temperature sensitivity, lack of needed mechanical strength in directions other than the direction of rotation, bulkiness, a fixed pivot axis, and excessive noise. (For purposes of pivotal mechanism terminology, and for purposes of this application, noise is defined as a jerkiness in the rotation of the mirror, typically caused by differing amounts of friction in the mechanism as it causes the mirror to rotate.)

Some examples of pivotal mechanisms known in the art include: (1) a shaft mounted in ball bearing; (2) elastomeric hinges; (3) a shaft mounted on jeweled pivots; and (4) "Free Flex" pivots, manufactured by the Bendix Corporation. ("Free Flex" is a registered trademark of the Bendix Corporation.)

Disadvantageously, shafts mounted in ball bearings have a limited life, exhibit excessive noise, and have a fixed pivot axis at the centerline of the shaft. While a shaft mounted on jeweled pivots reduces noise, such mechanisms still exhibit some undesirable friction and suffer from a limited life and a fixed pivot axis. Elastomeric hinges are bulky, temperature sensitive, noisy, and mechanically weak in directions other than the direction of rotation. Further, it is difficult to precisely define the pivot axis of an elastomeric hinge.

There is, therefore, a need in the art for an improved mechanism that does not suffer from the above disadvantages.

SUMMARY OF THE INVENTION

It is an object of the present invention to provide an improved pivotal or flexural mechanism for use in optical systems upon which a mirror or the like may be mounted for controlled rotation.

It is a further object of the present invention to provide such a flexural mechanism that is inexpensive, can be made in any size, and that has a pivot axis that can be selectively positioned to meet the requirements of a particular application.

It is still a further object of the present invention to provide such a flexual mechanism that exhibits low noise and that is insensitive to temperature variations. Another object of the present invention is to provide an improved flexural mechanism that is mechanically stiff in directions other than the direction of rotation.

Still another object of the present invention is to provide such a flexural mechanism that may be used for a long period of time without the need for adjustments, repair, or replacement.

The above and other objects of the invention are realized by constructing a flexural mechanism from a single sheet of material, such as metal, that exhibits desired mechanical properties. A desired pattern is etched or stamped into the sheet and the resulting shape is bent to form the flexural mechanism comprising a base, a mounting surface (upon which a mirror may be mounted), and a plurality of flexural arms connecting the base to the mounting surface.

Advantageously, a number of variables exist that can be readily controlled during the design and manufacture of the flexural mechanism so as to impart thereto desired characteristics. For example, the type of material used, its thickness, and the precise pattern etched or stamped therein can all be selectively controlled so as to allow the resulting flexural mechanism to meet the above stated objectives.

A unique feature of the present invention is the ability to change the pivot axis of the flexural mechanism by changing the shape of the pattern etched or stamped in the material. The ideal pivot axis is typically through the center of gravity of the mass being rotated. The present invention advantageously allows a flexural mechanism to be fabricated, having a pivot axis through the center of gravity of the mass being rotated, regardless of whether that axis lies inside or outside of the mechanism.

BRIEF DESCRIPTION OF THE DRAWINGS

The above and other objects, features, and advantages of the present invention will be more apparent from the following more particular description of the invention presented in conjunction with the following drawings, wherein:

FIG. 7 is a top view of another embodiment of the flexural mechanism of the present invention prior to the bending thereof, and as such illustrates another pattern that may be etched or stamped in the sheet of material used to fabricate the invention;

FIGS. 8a, 8b, and 8c are top, side, and end views respectively of the flexural mechanism of FIG. 7 after the bending thereof; and FIG. 9 is a cross sectional drawing of a typical application of the present invention showing the flexural mechanism of the type shown in FIG. 8 supporting a mirror to be rotated, and including the means used to cause the mirror to rotate.

DETAILED DESCRIPTION OF THE INVENTION

The following is a description of the best presently contemplated mode of carrying out the present invention. This description is given only to illustrate the general principles of the invention and is not to be taken in a limiting sense. The true scope of the invention is defined by the attached claims.

FIGS. 1 through 4 are various views of pivotal mechanisms of the prior art. They are presented in order to better understand the function of pivotal mechanisms, as well as to point out the advantages of the present invention over the prior art.

Figure 1:
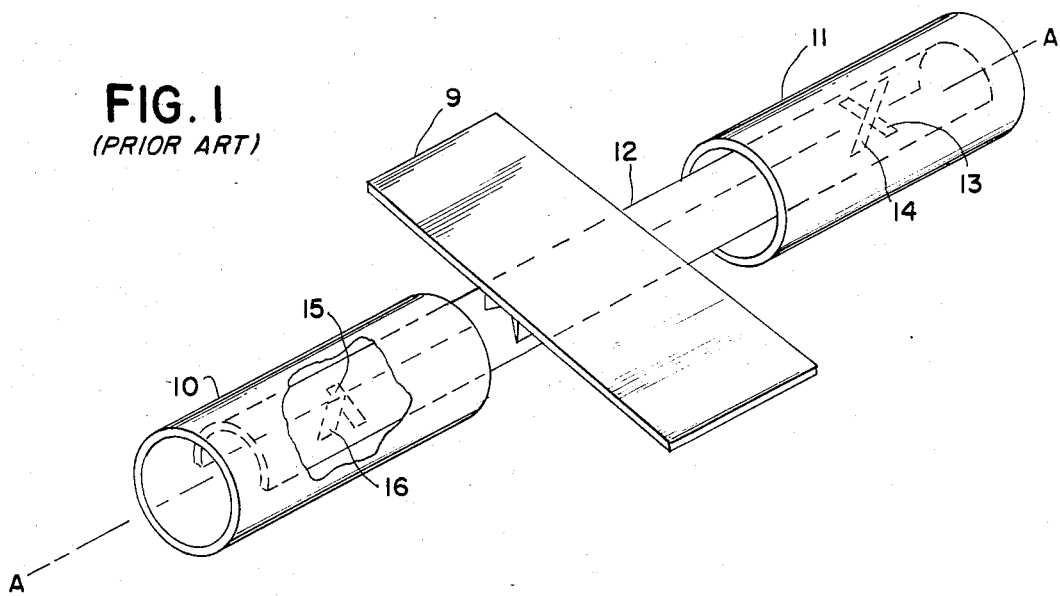
FIG. 1 is a perspective view of one type of pivotal mechanism known in the art.
Figure 2A:
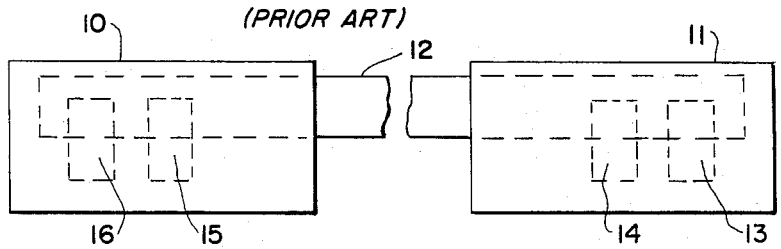
FIGS. 2a and 2b are side and end views respectively of the prior art mechanism of FIG. 1.
Figure 2B:
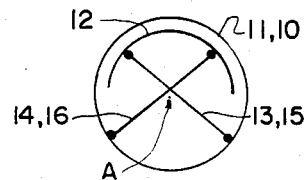

Referring first to FIGS. 1 and 2, a pivotal mechanism of a type similar to the "Free Flex" pivot, commercially available from Bendix Corporation, is shown. FIG. 1 is a perspective view of the device, and FIGS. 2a and 2b are side and end views respectively. A mirror 9 is mounted on the center piece 12, which center piece is attached to, and supported within two cylindrical end pieces 10 and 11 by four flex arms 13-16. Each of the flex arms 13-16 has its upper end welded to the inner surface of the center piece 12. The flex arms 13, 14 have their lower ends welded to the end piece 11, and the flex arms 15, 16 have their lower ends welded to the end piece 10.

As shown best in FIG. 2b, the flex arms 13, 14 and 15, 16 form an "X" where they appear to cross each other. The mirror 9 supported on the inner piece 12 may be rotated about a pivot axis A—A formed at the center of this "X", shown as A in FIG. 2b.

As discussed previously, pivotal mechanisms of the type shown in FIGS. 1 and 2 additional bracketry is required to support the end pieces 10, 11 and to add the mirror to the center piece 12; and the pivot axis A—A will always fall within the end pieces 10, 11.

Figure 3:
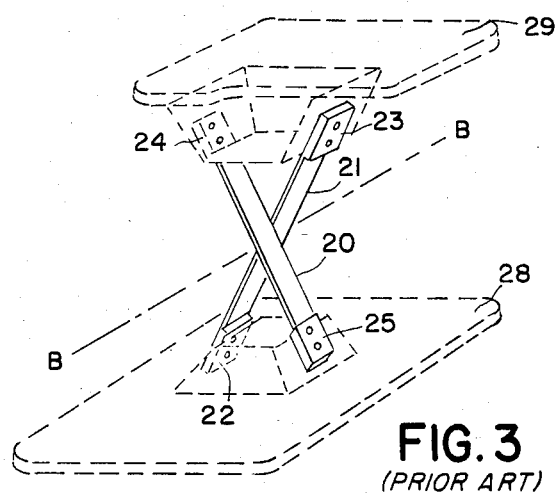
FIG. 3 is a perspective view of another type of pivotal mechanism known in the art.
Figure 4A:
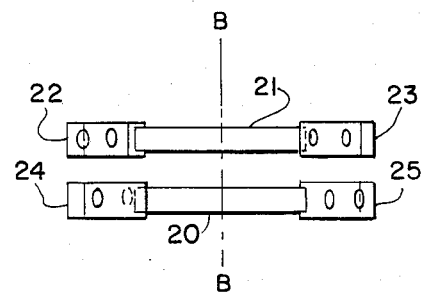
FIGS. 4a, 4b, and 4c are top, end and side views respectively of one pair of the flex arms used in the prior art mechanism of FIG. 3.
Figure 4B:
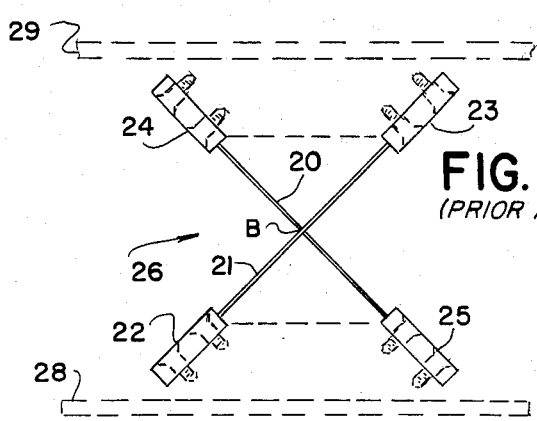
Figure 4C:
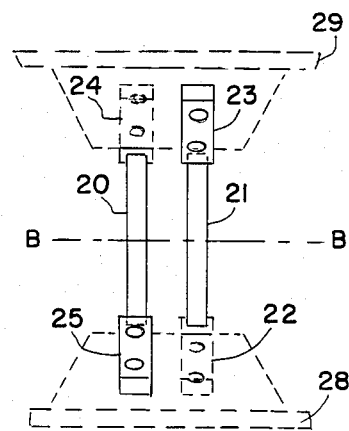

FIGS. 3 and 4 show another type of flexural mechanism used in the prior art. FIG. 3 is a perspective view, while FIGS. 4a, 4b and 4c are top, end, and side views respectively. This type of flexural mechanism typically comprises two pairs of flex arms connected between support structure 28 and a mirror 29. (Both the support structure 28 and mirror 29 are shown in FIG. 3 and FIG. 4b as dashed lines so as to emphasize the flex arm pairs.) One pair of these flex arms 26 is shown in FIGS. 3 and 4. The other pair of the flex arms used in the mechanism is identical to the pair 26 and need not be shown. The pair 26 includes identical, but separate, pieces. Each piece consists of two base sections 22 and 23, or 24 and 25, and a flex arm 20 or 21. The two bases, 22 and 25, are spaced apart an appropriate distance and attached by some means to the support structure 28, which is typically machined to produce the proper angle between the pair of flex arms. The mirror 29 is then attached by another machined piece to the two mounting surfaces of the base sections 23 and 24. For example, screws might be used for this purpose. When at rest, the surface of the mirror 29 is parallel with the surface of the support structure 28 mounting material.

When rotated, the mirror would rotate about a pivot axis B—B, which axis passes through the point where the flex arms appear to cross each other (which point is labeled B in FIG. 4b).

Figure 5:
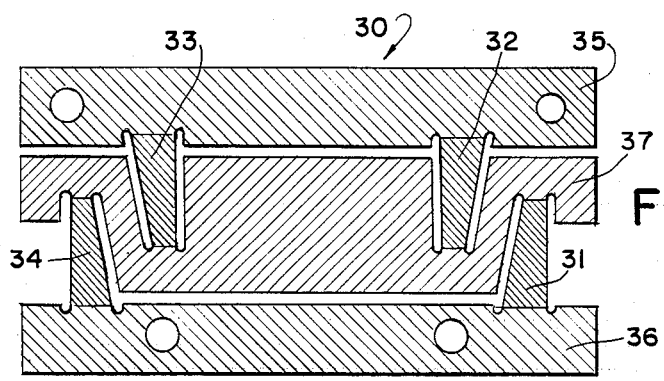
FIG. 5 is a top view of one embodiment of the flexural mechanism of the present invention prior to the bending thereof, and as such illustrates one pattern that may be etched or stamped in the sheet of material used to fabricate the invention.

FIGS. 5 and 6 show a flexural mechanism of one embodiment of the present invention. FIG. 5 is a top view of a piece of sheet material 30 that has a desired pattern etched or stamped therein. (The various cross hatchings in FIGS. 5 and 6 are to highlight various areas or sections of the material 30 and are not meant to conveyor a cross-sectional view.) Preferably, the sheet material 30 is a suitable metal or metal alloy, e.g., brass, Be-Cu (Beryllium-Copper), stainless steel, or the like; and is of an appropriate thickness to impart the desired properties (stiffness, resiliency, etc.) to the mechanism.

Standard etching techniques may be used to etch the pattern from the material. That is, the material 30 is coated with a photo sensitive material called a resist. A mask, comprising a clear plastic film with the opaque pattern on the film, is then placed firmly on the resist. (Depending upon the type of resist used, an opposite polarity mask may be required, i.e., an opaque plastic film with a clear pattern.) The combination is then exposed to light of the proper wavelength for the correct amount of time. The resist coated material is then developed in a chemical solution that removes the resist over the area of the pattern which is to be removed. An etching solution then is used to etch away the exposed material, while the resist coated material is unaffected.

Advantageously, the etching technique provides great accuracy, at a low cost. In the example of FIG. 5, the overall length of the material may be less than 0.4 inches. Using an etching technique, the desired pattern can be initially made many times larger and then reduced by photographic means to make the mask. Using such techniques, the pattern may be formed with dimensions that have errors of less than one thousandth of an inch. Alternatively, if this magnitude of accuracy is not required for the particular application at hand, the desired pattern may be quickly and inexpensively stamped into the material 30.

The pattern etched or stamped into the flat material 30 comprises three types of areas, as represented by the three different types of cross hatching used in FIG. 5. These areas are: (1) the base 35-36, (2) the four flex arms 31-34, and (3) the mounting surface 37.

Once the pattern is placed in the material, the material is formed into the flexural mechanism through a bending process. The process comprises holding the two base segments 35-36 flat, while allowing them the ability to move toward each other, and pulling the mounting surface 37 away from the base 35-36. As this happens, the flex arms 31-34 form a smooth curve (see FIG. 6c) where they join the base segments 35-36 and mounting surface 37. This smooth curve in the flex arms 31-34, as opposed to a sharp crease or fold, allows the flexure mechanism to flex without causing the material at the smooth curves of the flexure arms 31-34 to fatigue, i.e., become embrittled and break.

Figure 6A:
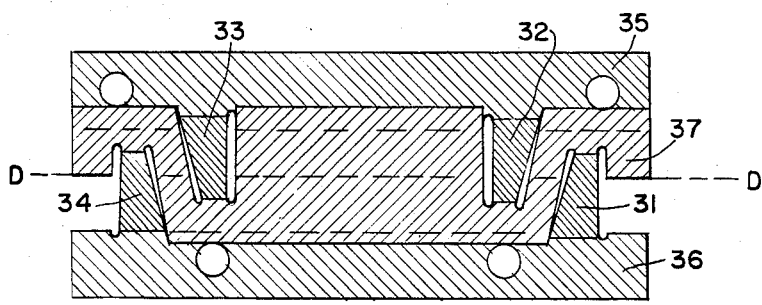
FIGS. 6a, 6b, and 6c are top, side, and end views respectively of the flexural mechanism of FIG. 5 after the bending thereof.

FIG. 6a is a top view of the material of FIG. 5 after it has been formed into a flexural mechanism. As can be seen in the figure, the flex arms 31-34 appear to be shortened, since they are no longer in the plane of the drawing, and the mounting surface 37 extends over the base segments 35-36 since as the mounting surface was pulled away from the base segments, they moved toward each other.

Figure 6C:
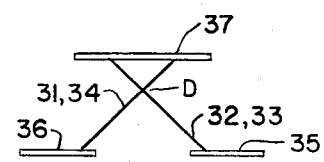
Figure 6B:
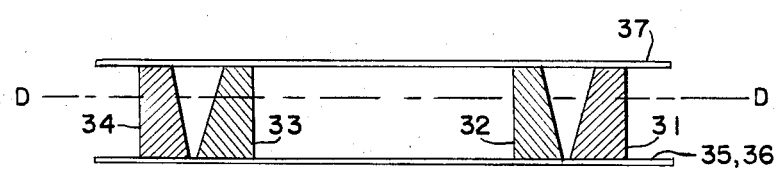

FIG. 6b is a side view of the flexural mechanism of FIG. 6a showing the mounting surface 37 parallel with the base segments 35-36 and supported by the flex arms 31-34. FIG. 6c is an end view of the mechanism of FIGS. 6a and 6b showing the pivot axis D on the line where the flex arms 31, 32 and 33, 34 appear to cross.

FIG. 7 shows a flexural mechanism of a second embodiment of the present invention and is included to illustrate the versatility of the invention.

The end view of the flexural mechanism shown in FIG. 8c shows the result of the different pattern etched in the material. The pivot axis, D' is outside the flexural mechanism at a point determined by extending the paths of the flexure arms until they intersect.

As explained previously, the ideal pivot axis is through the center of gravity of the mass to be rotated. If the pivot axis is anywhere other than the center of gravity, small forces may be required to move it in one direction while larger forces, because of the unbalanced mass, may be required to move it back. Further, vibrations in the base can cause mirror rotation due to the unbalanced mass. This susceptability to mirror vibration, as well as the unequalness is moving force, can cause undue complications for the control system used to rotate the mirror mounted on the flexural mechanism.

FIG. 9 is a cross sectional drawing showing a flexural mechanism 40 of the present invention in a typical application. A mirror 41 is mounted on a support structure 42. Also attached to the support structure is a coil 43. The entire mass to be rotated, consisting of the mirror 41, support structure 42, and coil 43 is mounted on the mounting surface of flexural mechanism 40. Note that the flexural mechanism 40 is of the type shown in FIGS. 7 and 8.

The flexural mechanism 40 is mounted on a base support 45. Also mounted on the base support 45 are iron pole pieces 46-47. Attached to the pole pieces are permanent magnets 48-49.

In application, a current in the coil 43 creates a magnetic field that interacts with the magnetic fields of the permanent magnets. The magnets 48 and 49 are magnetized so that the resultant force on the coil is a torque (up on one side and down on the other) which causes the mirror to rotate.

As shown in FIG. 9, the flexural mechanism 40 is of the type shown in FIGS. 7 and 8 with the pivot point at F in FIG. 9 being outside the flexural mechanism. However, if for a given application it would be more advantageous to mount the permanent magnets 48-49 on the support structure 42 and to place the coil 43 on the base support 45, and if the permanent magnets 48-49 have a much larger mass than the coil 43, then the center of gravity of the rotated mass would be lower than the point F shown in FIG. 9. In such a situation, if the center of gravity is still outside the flexural mechanism, then the dimensions of the flexural mechanisms of FIGS. 7 and 8 can be readily changed to make the pivot axis correspond with the center of gravity. If, on the other hand, the center of gravity falls within the flexural mechanism, then a mechanism of the type shown in FIGS. 5 and 6 could be used. Hence, the present invention advantageously allows the flexural mechanism to be tailored to meet the unique requirements of a given application.

What is claimed is:

1. An improved flexural mechanism for pivoting a first object a few degrees plus or minus about an axis of rotation comprising:

a plurality of spaced-apart base sections lying in a first plane;

a mounting surface lying in a second plane; and a plurality of flex arm pairs coupling said base sections to said mounting surface, each of said pairs comprising a first flex arm extending from a first of said base sections to said mounting surface, and a second flex arm extending from a second of said base sections to said mounting surface, said axis of rotation passing through a point where said first and second flex arms, or the extensions thereof, appear to cross when said mechanism is viewed from an end thereof;

said base sections, mounting surface, and flex arm pairs being characterized as initially forming part of an integral sheet of flexible material, which material has a pattern placed therein that defines the size, shape, and location of said base sections, mounting surface, and flex arm pairs;

said base sections being affixed to a suitable base material, and said first object being affixed to said mounting surface;

whereby if one of said base material or first object is held stationary, the other of said base material or first object may be selectively pivoted a few degrees plus or minus about said axis of rotation.

2. The flexural mechanism as defined in claim 1 wherein said flex arms smoothly bend away from said base sections and mounting surface without any sharp creases or folds existing in said flex arms at the junction where said flex arms joint the edges of said base sections and mounting surface.

3. The flexural mechanism as defined in claim 2 wherein said axis of rotation is located on a line lying between said first and second planes.

4. The flexural mechanism as defined in claim 2 wherein said axis of rotation is located on a line lying above said second plane.

5. The flexural mechanism as defined in claim 2 wherein said first object is a mirror used in an optical system.

6. The flexural mechanism as defined in claim 5 further including means for selectively pivoting said mirror about said axis of rotation.

* * * * *